Patented Oct. 14, 1952

2,614,122

UNITED STATES PATENT OFFICE 2,614,122

PREPARATION OF DICARBOXYLIC ACIDS FROM SATURATED MONOCARBOXYLIC ACIDS

Louis A. Mikeska, Westfield, N. J., assignor to Standard Oil Development Company, a corporation of Delaware No Drawing. Application May 23, 1951, Serial No. 227,940

4 Claims. (Cl. 260—531)

This invention relates to a novel process for the preparation of dicarboxylic acids from saturated monohydroxy monocarboxylic acid derivatives.

It is known that decanedioic acid can be prepared by heating ricinoleic acid with sodium hydroxide. The dibasic acid formed, as explained in detail below, is split off from the parent molecule at the double bond, not at the carbon atom containing the hydroxyl group. Thus the double bond acts as a limiting factor on the total carbon number length of the dibasic acid produced. This is undesirable, because long chain dibasic acids and their derivatives are finding increasing utility as lubricating oil improvers, e. g., viscosity index improving agents, and as synthetic lubricants. These longer chain dicarboxylic acids have hitherto been difficult to prepare.

This invention provides an improved flexible method for preparing dicarboxylic acids. The method comprises fusing an alkali metal hydroxide with a saturated monohydroxy monocarboxylic acid or its alkali metal salt whose hydroxyl group is linked to a non terminal, secondary carbon atom. The hydroxy acid is thus cleaved at the carbon atom linked to the hydroxyl group, and thus the resulting dicarboxylic acid contains the same number of carbon atoms between the carboxyl groups as the carbon atom chain between the hydroxylated secondary carbon atom and the carboxylic group of the hydroxy carboxylic acid used. The fused product is then treated with a slight excess of mineral acid to liberate the mono and dicarboxylic acids. These are then separated by treating the mixture with solvents such as petroleum naphtha, ether, etc. The monobasic acids which are obtained as by-products of the reaction are soluble in naphtha, while dicarboxylic acids are not. Simple filtration effects an almost complete separation.

The relationship between starting material and dibasic acid product formed is further illustrated below. Equation I illustrates the product obtained from a saturated hydroxy acid by the process of this invention. Equation II illustrates the product obtained by the prior art processes utilizing an unsaturated acid. In both cases the hydroxyl group is attached to the twelfth carbon atom.

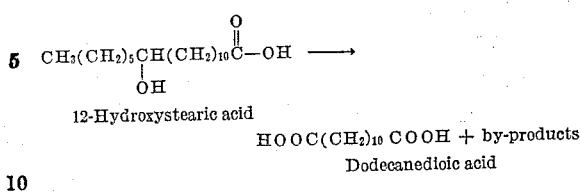

Equation I

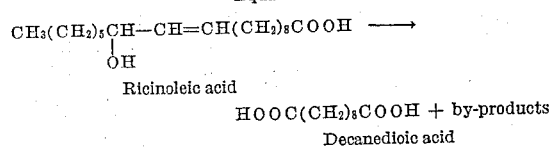

Equation II

It should be noted that the dibasic acids obtained are not identical but differ by two carbon atoms, that is, the diacid derived from the saturated hydroxy acid has two more carbon atoms between carboxylic groups than the diacid derived from ricinoleic acid. Only by the process of this invention is a product obtained which has the same number of carbon atoms between the carboxyl groups as the carbon atom chain between the hydroxylated secondary carbon atom and the carboxylic group of the hydroxy carboxylic acid used.

The fusion of the saturated hydroxy monocarboxylic acid derivative according to the process of this invention with an alkali metal hydroxide takes place at a temperature of from 230° to 320° C., preferably 280° to 320° C. Hydrogen is obtained as one of the by-products. The reaction can conveniently be performed in a bomb, in which case no solvent need be employed. A solvent is advantageous, however, where the reaction is conducted under atmospheric pressure. Solvents that can be employed are those such as high-boiling saturated petroleum hydrocarbons (those boiling above about 320° C.), e. g., mineral oil, white oil, etc. The product is then isolated in the conventional manner as is further detailed in the specific examples given below.

The saturated hydroxy monocarboxylic acid derivatives that can be utilized in the process of this invention are illustrated in Formula I below:

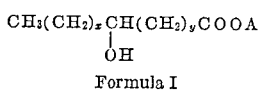

Formula I wherein $x$ is a number from 0 to 15, $y$ is a number from 1 to 15, and A is a radical selected from the group consisting of hydrogen and alkali metal radicals. Because of cost factors the sodium and potassium radicals of the alkali metal group are preferable. Thus, examples of hydroxy acids that can be utilized in this invention are 9-hydroxystearic acid, 10-hydroxystearic acid, 14-hydroxystearic acid, 4-hydroxy valeric acid, etc. These hydroxy acids can be prepared by conventional means such as the hydration of unsaturated acids.

The hydroxy stearic acids are especially adapted for use in this invention. Particularly effective and desirable is 12-hydroxystearic acid, which on fusion results in the production of dodecanedioic acid.

The alkali metal hydroxides are employed in a slight excess over one mole per hydroxyl group, plus the alkali needed to neutralize the carboxylic acid group. Because of cost factors it is preferred to use the sodium and potassium hydroxides. Eutectic mixtures of these can also be used to advantage.

This invention will be better understood by reference to the following examples of the preparation of the indicated compounds according to the process of this invention.

Example I

A round bottom flask was fitted with a stirrer, a return condenser attached through a water trap, a thermometer and an inlet tube for nitrogen, and was charged with 100 gms. of 12-hydroxystearic acid, 33 gms. of sodium hydroxide, 45 gms. of potassium hydroxide and 200 ml. of white oil. While nitrogen was bubbled through the mixture it was heated with stirring until hydrogen began to be given off at 235° C. The passage of nitrogen was then discontinued and the upper part of the return condenser was connected with a flow meter to measure the hydrogen as it was evolved. Heating was continued at such a rate as to maintain the evolution of hydrogen at a convenient rate. By the time (about two hours) that a temperature of 320° C. was reached, the evolution of hydrogen had ceased. Hence the reaction was discontinued. When the reaction mixture had cooled somewhat, water was added and stirring was continued for a few minutes to dissolve the soap.

The mixture was then transferred into a separatory funnel and was extracted several times with naphtha to remove the white oil. The aqueous layer was then acidified with a slight excess of hydrochloric acid. The acid product separated as a water insoluble oil, which oil was then extracted with diethyl ether. The extract was washed free of hydrochloric acid and dried over sodium sulfate. On removal of the ether on the steam bath, a residue consisting of 103 gms. of light colored oil was obtained. The latter solidified on standing at room temperature. The solid material was then treated with warm petroleum ether, and filtered. The washing with petroleum ether removed any monobasic acid present. The precipitate was washed several times with petroleum ether. The washed material consisted of 29.5 gms. of white solid, which had a combining weight of 124.3. On recrystallization from toluene the product was obtained as a snow white material with a combining weight of 124. Theoretical combining weight for dodecanedioic acid is 115. The product melted at 123° C.

Example II

The same oxidation apparatus as described in the preceding experiment was charged with 96.6 gms. (=0.3 mole) of dry sodium 12-hydroxy stearate. To this was added 12 gms. of sodium hydroxide, 16.8 gms. of potassium hydroxide and 300 ml. of white oil. The mixture was then heated with stirring. Hydrogen began to be given off at about 230° C. A total of 8650 ml. of hydrogen was collected at 25° C. The mixture of acids was isolated as described in the preceding experiment. The crude mixture weighed 98 gms. and had a combining weight of 195.2. The dibasic acid was separated from the other products by treating the crude material with petroleum ether. The dibasic acid, before recrystallization from acetone, weighed 26 gms. The final crystalline material obtained had a combining weight of 123 and melting point of 127° C.

There are several distinct advantages inherent in the process of this invention. Among these is the fact that the reaction is straightforward and consequently the desired products are easily and economically separated from other reaction constituents. In addition, dibasic acids are prepared which cannot be obtained readily by other processes. Other advantages will be apparent to those skilled in the art.

It is to be understood that the invention is not limited to the specific examples, which have been offered merely as illustrations, and that modifications may be made in equipment and conditions within the ranges specified without departing from the spirit of this invention.

What is claimed is:

1. A process for preparing dicarboxylic acid and monocarboxylic acid products from a monohydroxy stearic acid, in which the hydroxyl group is linked to a non-terminal, secondary carbon atom and segregating said acid products, which comprises reacting the monohydroxy stearic acid with an alkaline metal hydroxide in liquid phase in the presence of a saturated petroleum hydrocarbon solvent boiling above about 320° C. at temperatures in the range of about 230° C. to 320° C., dissolving the resulting liquid reaction product in an aqueous solution, acidifying the resulting aqueous solution to separate therefrom the acid products as an oil phase and separating from said acid products an extract solution of monocarboxylic acid products soluble in petroleum ether.

2. A process as in claim 1 in which the hydroxy stearic acid is 12-hydroxy stearic acid.

3. A process for preparing a dicarboxylic acid which comprises fusing a saturated monohydroxy stearic acid whose hydroxyl group is linked to a non-terminal secondary carbon atom with an alkali metal hydroxide in liquid phase at a temperature in the range of 230°-320° C. in the presence of a saturated petroleum hydrocarbon solvent boiling above about 320° C. and acidifying the resulting product, whereby a dicarboxylic acid product is obtained containing the same number of carbon atoms between the carboxyl groups as the carbon atom chain between the secondary carbon atom to which the hydroxyl group is linked and the carboxylic group of the hydroxy stearic acid.

4. The process as in claim 3 in which the dicarboxylic acid product is dodecanedioic acid and the hydroxy stearic acid is 12-hydroxy stearic acid.

LOUIS A. MIKESKA.

REFERENCES CITED

The following references are of record in the file of this patent:

UNITED STATES PATENTS

| Number | Name | Date |
|---|---|---|
| 1,926,068 | Strosacker et al. | Sept. 12, 1933 |
| 2,182,056 | Bruson et al. | Dec. 5, 1939 |
| 2,196,581 | Stephenson et al. | Apr. 9, 1940 |
| 2,217,515 | Houpt | Oct. 8, 1940 |
| 2,217,516 | Houpt | Oct. 8, 1940 |
| 2,304,602 | Schrauth et al. | Dec. 8, 1942 |